(12) United States Patent
Calamatas

(10) Patent No.: US 6,198,241 B1
(45) Date of Patent: Mar. 6, 2001

(54) MOTOR PROTECTION FOR A POWERED DOOR SYSTEM

(75) Inventor: Philip J. Calamatas, Fabreville Laval (CA)

(73) Assignee: Westinghouse Air Brake Company, Wilmeriding, PA (US)

( * ) Notice: Subject to any disclaimer, the term of this patent is extended or adjusted under 35 U.S.C. 154(b) by 0 days.

(21) Appl. No.: 09/349,010

(22) Filed: Jul. 7, 1999

(51) Int. Cl.[7] .............................. H02K 23/68; H02H 7/09
(52) U.S. Cl. ..................... 318/434; 361/30; 361/31; 361/33
(58) Field of Search .................. 318/434; 361/28, 361/31, 23, 30, 33

(56) References Cited

U.S. PATENT DOCUMENTS

| | | | |
|---|---|---|---|
| 3,332,007 | * 7/1967 | Livengood et al. | 323/9 |
| 4,541,029 | * 9/1985 | Ohyama | 361/31 |
| 5,574,608 | * 11/1996 | Fukukoa | 361/23 |
| 5,773,945 | * 6/1998 | Kim et al. | 318/434 |

* cited by examiner

Primary Examiner—Karen Masih
Assistant Examiner—Marlon Fletcher
(74) Attorney, Agent, or Firm—James Ray & Associates

(57) ABSTRACT

A motor protection circuit for an electric motor driven by a pulse width modulated amplifier. It has a capacitor and a first conduction path connected to a first terminal of the capacitor and connectable to a first conductor. It also has a second conduction path connected to the second capacitor terminal and connectable to a second conductor. There is a DC voltage difference between the first conductor and the second conductor. There is a third conduction path between the first terminal and the second terminal. The third conduction path having a resistance which is lower than the resistance of the first conduction path plus the resistance of the second conduction path. The third conduction path passes through a switch which has an input connection to be opened and closed thereby. The input connection is for receiving a signal indicating a motor overload condition, whereby the capacitor discharge switch is closed when the signal indicates the motor overload condition and the capacitor discharge switch is opened when the signal does not indicate the motor overload condition. A charge on the capacitor increases when the signal does not indicate the motor overload condition and the charge on the capacitor decreases when the signal indicates the motor overload condition. The circuit also has a voltage comparator receiving the voltage of the capacitor. The voltage comparator produces a signal for shutting down the motor.

22 Claims, 3 Drawing Sheets

MOTOR PROTECTION FOR A POWERED DOOR SYSTEM

CROSS-REFERENCE TO RELATED APPLICATIONS

The invention described in this patent application is closely related to the following copending patent application: TRANSIT VEHICLE DOOR, Ser. No. 09/099,260 which was filed on Jun. 18, 1998. It is also related to the provisional application: INTELLIGENT DOOR CONTROL UNIT, which was filed on Nov. 25, 1998 and the application: DYNAMIC BRAKE FOR POWER DOOR which was also filed on Nov. 25, 1998. The teachings of each of these applications and the provisional application cited above are hereby incorporated by reference thereto. The applications and provisional application referenced above are assigned to the assignee of the present application.

FIELD OF THE INVENTION

The present invention relates, in general, to motor protection circuits and, more particularly, the instant invention relates to motor protection for transit vehicle door systems and/or elevator doors.

BACKGROUND OF THE INVENTION

Powered door systems for use on transit vehicles, elevators and the like typically experience very heavy usage which may place severe demands on the motors that open and close the doors. Such motors are generally undersized due to size and weight constraints. Consequently, motor protection circuits are generally necessary to prevent burn out of such motors.

The friction which the doors experience when they are moved between open and closed positions may increase due to a number of factors including temperature, loss of lubricant, galling of load bearing surfaces, etc. In such applications, the doors may be quite massive and may be required to move rapidly between open and closed positions. This places a heavy demand on the motors to overcome the inertia of the doors when accelerating and decelerating the doors during opening and closing strokes of the doors. The doors may also encounter obstructions that require rapid braking which may be done dynamically, again placing heavy loads on the motors. All of these factors cause heat buildup in the windings of the motors.

In order to prevent such motors from overheating, one prior art approach is to place a temperature sensing element in the winding of the motor. The temperature sensing element may include a switch to open the circuit of the motor winding in the event that a dangerously high temperature is encountered. Another approach is to place a temperature sensor in the windings which has signal connection to a controller for the motor to turn off the current to the motor in the event of a dangerously high temperature. Such approaches generally respond slowly to motor overload conditions due to the time needed for heat to penetrate the insulation on the temperature sensor.

SUMMARY OF THE INVENTION

In one aspect, the invention is a motor protection circuit for an electric motor driven by a pulse width modulated motor drive amplifier. It has a capacitor having a first terminal and a second terminal and a first conduction path connected to the first terminal, the first conduction path being for connection to a first conductor. It also has a second conduction path connected to the second terminal, the second conduction path being for connection to a second conductor. There is a DC voltage difference between the first conductor and the second conductor. There is also a third conduction path connecting the first terminal and the second terminal. The third conduction path having a third conduction path resistance which is lower than the resistance of the first conduction path plus the resistance of the second conduction path. The third conduction path passes through a capacitor discharge switch. The capacitor discharge switch having a switch signal input connection to be opened and closed thereby. The switch signal input connection is for receiving a first digital signal indicating a motor overload condition, whereby the capacitor discharge switch is closed when the first digital signal indicates the motor overload condition and the capacitor discharge switch is opened when the first digital signal does not indicate the motor overload condition, so that a charge on the capacitor increases when the first digital signal does not indicate the motor overload condition and so that the charge on the capacitor decreases when the first digital signal indicates the motor overload condition. The circuit also has a voltage comparator connected to receive a capacitor voltage from the capacitor. The capacitor voltage being due to the charge on the capacitor. The voltage comparator produces a second digital signal indicating whether the capacitor voltage is below a predetermined voltage level, the second digital signal being for signalling a shut down switch to shut down the motor.

In another aspect, the invention is a motor protection circuit for an electric motor driven by a pulse width modulated motor drive amplifier. It has a capacitor having a first terminal and a second terminal and a first conduction path connected to the first terminal. The first conduction path being for connection to a first conductor. It also has a second conduction path connected to the second terminal. The second conduction path being for connection to a second conductor. There is a DC voltage difference between the first conductor and the second conductor. There is also a third conduction path between the first terminal and the second terminal. The third conduction path having a third conduction path resistance which is lower than the resistance of the first conduction path plus the resistance of the second conduction path. The third conduction path passes through a capacitor discharge switch. The capacitor discharge switch having a switch signal input connection to be opened and closed thereby. The switch signal input connection is for receiving a first digital signal indicating a motor overload condition, whereby the capacitor discharge switch is closed when the first digital signal indicates the motor overload condition and the capacitor discharge switch is opened when the first digital signal does not indicate the motor overload condition, so that a charge on the capacitor increases when the first digital signal does not indicate the motor overload condition and so that the charge on the capacitor decreases when the first digital signal indicates the motor overload condition. The circuit also has a voltage comparator connected to receive a capacitor voltage from the capacitor. The capacitor voltage being due to the charge on the capacitor. The voltage comparator produces a second digital signal indicating whether the capacitor voltage is below a predetermined voltage level. The circuit also has a shut down switch connected to shut down the motor based on the second digital signal.

In another aspect the invention provides an electric motor and motor control system having overload protection. It has an electric motor driven by a pulse width modulated motor drive amplifier. It also has a capacitor having a first terminal and a second terminal and a first conduction path connected to the first terminal. The first conduction path being for connection to a first conductor. It also has a second conduction path connected to the second terminal. The second conduction path being for connection to a second conductor. There is a DC voltage difference between the first conductor and the second conductor. There is also a third conduction path between the first terminal and the second terminal. The third conduction path having a third conduction path resistance. The third conduction path resistance being lower than a resistance of the first conduction path plus a resistance of the second conduction path. The third conduction path passes through a capacitor discharge switch. The capacitor discharge switch having a switch signal input connection to be opened and closed thereby. The switch signal input connection is for receiving a first digital signal indicating a motor overload condition from the pulse width modulated motor drive amplifier, so that the capacitor discharge switch is closed when the first digital signal indicates the motor overload condition and so that the capacitor discharge switch is opened when the first digital signal does not indicate the motor overload condition. In this arrangement, a charge on the capacitor increases when the first digital signal does not indicate the motor overload condition and the charge on the capacitor decreases when the first digital signal indicates the motor overload condition. The system also has a voltage comparator connected to receive a capacitor voltage from the capacitor. The capacitor voltage being due to the charge on the capacitor. The voltage comparator produces a second digital signal indicating whether the capacitor voltage is below a predetermined voltage level. There is also a shut down switch connected to receive the second digital signal. The shut down switch being for shutting down the motor.

OBJECTS OF THE INVENTION

It is therefore one of the primary objects of the present invention to provide a motor protection circuit which responds quickly to a motor overload condition.

Another object of the present invention is to provide a motor protection circuit which activates a shutdown latch for the motor.

Still another object of the present invention is to provide a motor protection circuit with a shutdown latch which may be reset by a signal from a microprocessor that controls the motor.

Yet another object of the present invention is to provide a motor protection circuit which responds to a motor overload condition more rapidly than a thermal sensor in the motor winding.

A further object of the present invention is to provide a motor protection circuit for a motor driven by a pulse width modulated motor drive amplifier.

It is an additional object of the present invention to provide a motor protection circuit for a motor driven by a pulse width modulated H-bridge amplifier.

Still yet another object of the present invention is to provide a motor protection circuit for a motor which turns the motor off based on either an electrical or a thermal overload indicating signal.

Yet still another object of the present invention is to provide a motor protection circuit in which overload indications are integrated in a capacitor to provide a shutdown signal.

A still further object of the present invention is to provide a motor protection circuit for a motor driven by a pulse width modulated motor drive amplifier, in which the amplifier is shut down in the event that the motor protection circuit generates a shut down signal.

Another object of the present invention is to provide a fail safe motor protection circuit for an electric motor driven by a pulse width modulated motor drive amplifier.

An additional object of the present invention is to provide a motor protection circuit for an electric motor which can be tested by a microprocessor that controls the motor prior to operation of the motor.

A further object of the present invention is to provide a motor protection circuit for an undersized electric motor.

In addition to the various objects and advantages of the present invention which have been generally described above, there will be various other objects and advantages of the invention that will become more readily apparent to those persons who are skilled in the relevant art from the following more detailed description of the invention, particularly, when the detailed description is taken in conjunction with the attached drawing figures and with the appended claims.

Figure 1:
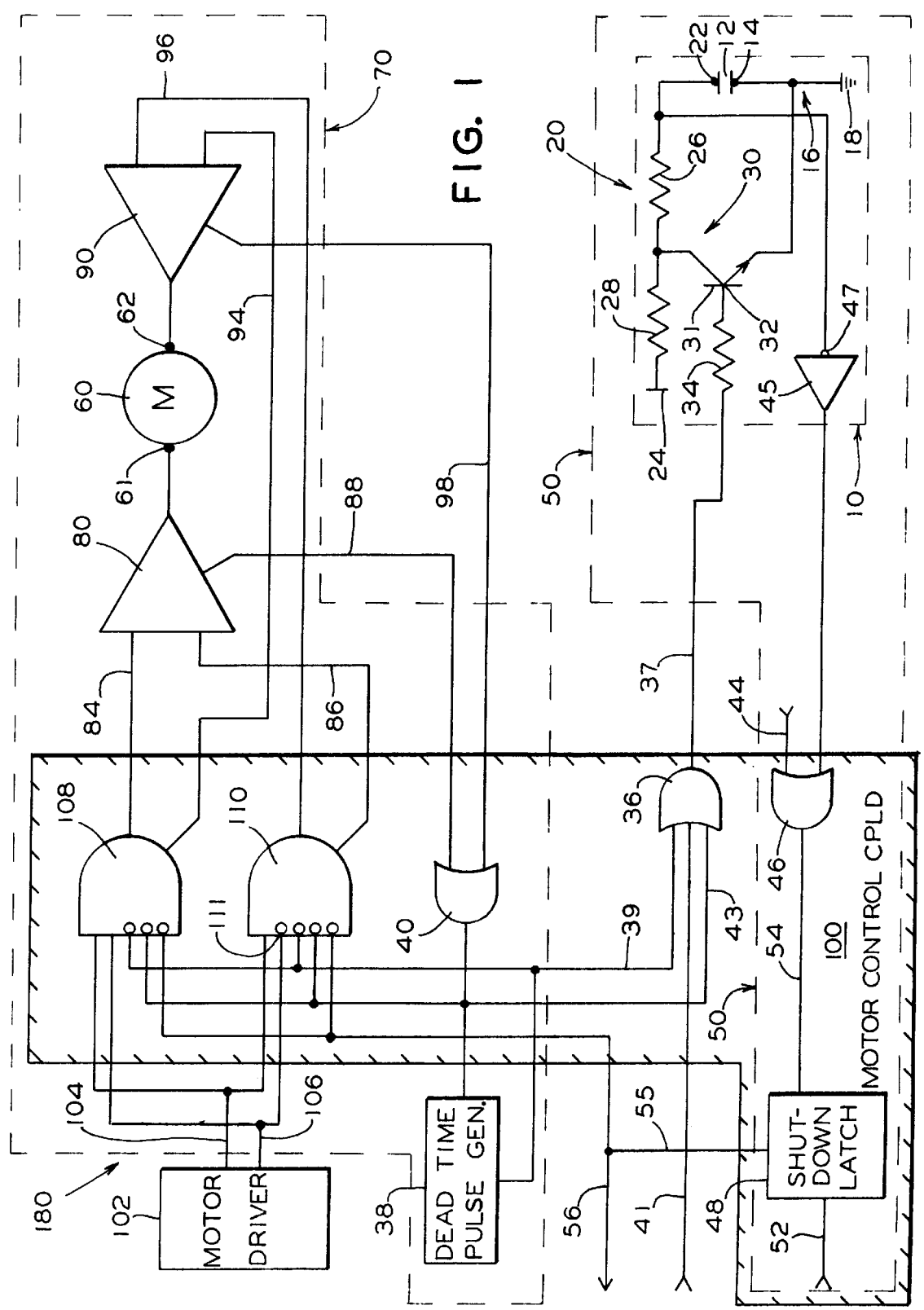
FIG. 1 is a block diagram of a motor protection circuit for a DC motor powered by an H-bridge amplifier.

BRIEF DESCRIPTION OF THE PRESENTLY PREFERRED AND VARIOUS ALTERNATIVE EMBODIMENTS OF THE INVENTION

Prior to proceeding to the much more detailed description of the present invention, it should be noted that identical components which have identical functions have been identified with identical reference numerals throughout the several views illustrated in the drawing figures for the sake of clarity and understanding of the invention.

Reference is now directed to FIG. 1 which illustrates an electric motor and motor control system, generally designated 180. Illustrated therein is a motor protection circuit, generally designated 10, according to one presently preferred embodiment of the instant invention. Circuit 10 provides protection of an electrical motor 60 which, in such presently preferred embodiment, is a DC motor having a first motor terminal 61 and a second motor terminal 62. Preferably, motor 60 is a DC motor having brushes and a permanent magnet as the field magnet. In the presently preferred embodiment, such electric motor 60 will be driven by a pulse width modulated motor drive amplifier 70 which receives pulses on pulse signal line 104 and direction signals on direction signal line 106 from a motor driver chip 102.

Figure 2:
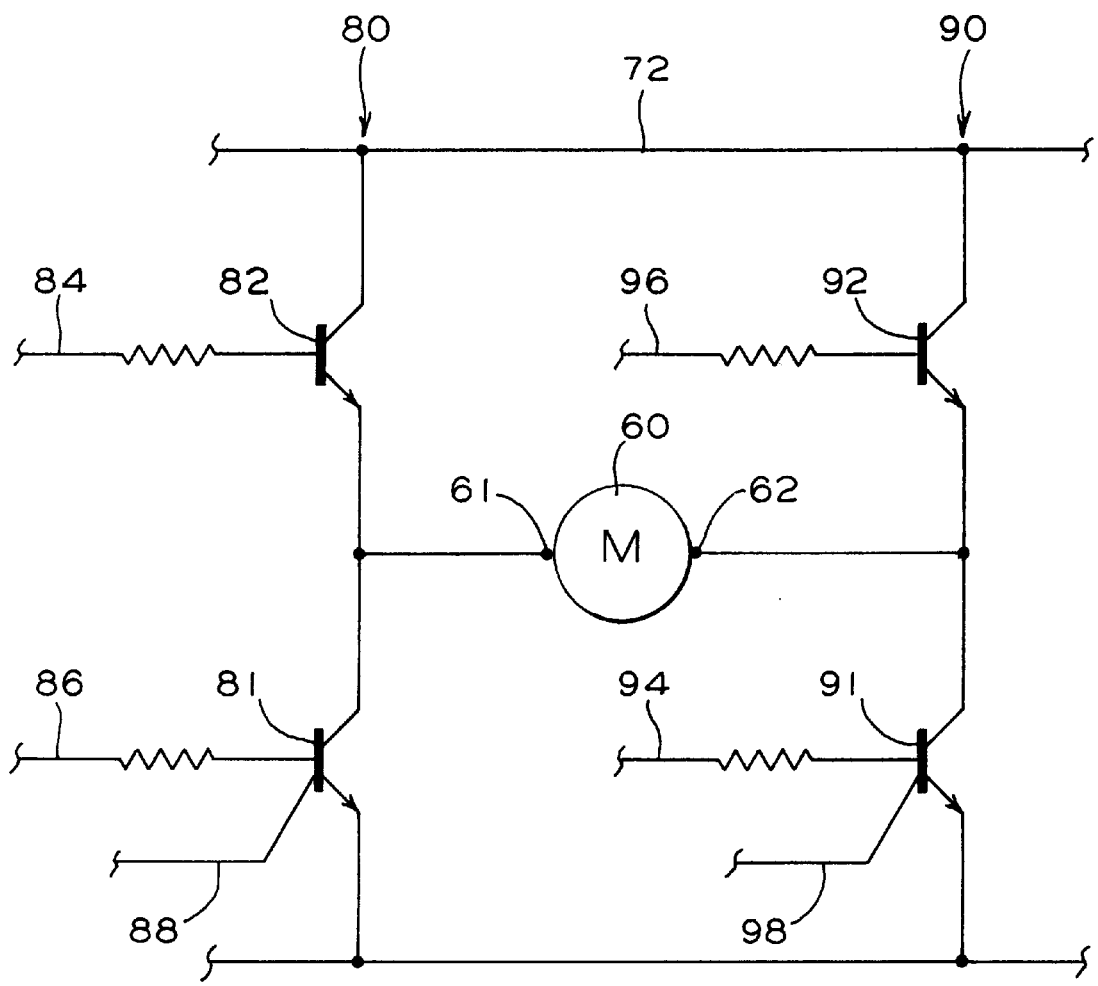
FIG. 2 is a schematic diagram illustrating such an H-bridge amplifier.

Pulse width modulated motor drive amplifier 70 has a first ½ bridge amplifier, generally designated 80, and a second ½ bridge amplifier, generally designated 90. Details of the ½ H-bridge amplifier 80 and the ½ H-bridge amplifier 90 are illustrated in FIG. 2, which shows both halves of the H-bridge amplifier. A person skilled in the art will generally recognize the block diagram of FIG. 1 as referencing the more complete circuit of FIG. 2.

The ½ H-bridge amplifier 80 includes a first switch 81 for connecting a first motor terminal 61 to a first power line 71, as well as a second switch 82 connecting such first terminal 61 to a second power line 72. First switch 81 is closed by a signal on signal line 86 and second switch 82 is closed by a signal on signal line 84. The current in switch 81 is indicated by signal line 88. There is a DC voltage difference between first power line 71 and second power line 72.

The ½ H-bridge amplifier 90 includes first switch 91 for connecting second motor terminal 62 to first power line 71, as well as second switch 92 connecting second terminal 62 to second power line 72. First switch 91 is closed by a signal on signal line 94 and second switch 92 is closed by a signal on signal line 96. The current in switch 91 is indicated by signal line 98.

A person skilled in the art should recognize that such switches 81, 82, 91 and 92 in FIG. 2 may be, for example, transistors, Insulated Gate Bipolar Transistors (IGBTs), or Metal Oxide Field Effect Transistors (MOSFETs). In the presently preferred embodiment, they are N-channel MOSFETs.

Current indicating signals on lines 88 and 98 are combined in an overcurrent logic gate 40 and passed on signal line 43 to a first digital signal logic gate 36 which places a first digital signal on line 37 and applied to motor protection circuit 10.

Current indicating signals are available on current terminals of IGBTs or MOSFETs which incorporate internal current sensing. Alternatively, shunt resistors (not shown) may be employed.

Overcurrent logic gate 40 is shown in FIG. 1 to be an OR gate. A person skilled in the art will recognize that the same logical function would be provided by an AND gate with inverting inputs and an inverting output.

In the presently preferred embodiment, the signals on lines 84 and 94 are supplied by logic gate 108 which combines a pulse signal on line 104 and a polarity signal on line 106. The signals on lines 104 and 106 are supplied by motor driver chip 102.

Likewise, in the presently preferred embodiment, signals on lines 86 and 96 are supplied by logic gate 110 which combines a pulse signal on line 104 and a direction signal on line 106 which is inverted at inverting input 111. The signals on lines 86 and 96 from logic gate 110 produce rotation of the motor 60 in a direction opposite to the rotation caused by signals on lines 84 and 94 from logic gate 108. In the presently preferred embodiment, the logic gates 108, 110, 40 and 36 are disposed in Motor Control CPLD 100.

In FIG. 1, logic gates 108 and 110 are AND gates which have some inverting inputs indicated by dots. A person skilled in the art will recognize that their logical functions can also be performed by OR gates in which each input is inverted relative to FIG. 1 and in which the output is also inverted.

Motor protection circuit 10 has a capacitor 12 having a first terminal 14 and a second terminal 22. Circuit 10 has a first conduction path 16 connected to first terminal 14. First conduction path 16 is for connection to a first conductor 18. Preferably, first conductor 18 is ground. Preferably, conduction path 16 has substantially zero resistance.

Circuit 10 also has a second conduction path 20 connected to second terminal 22. Second conduction path 20 is for connection to a second conductor 24. There is a DC voltage difference between the first conductor 18 and the second conductor 24. In the presently preferred embodiment shown, second conduction path 20 includes resistor 26 and resistor 28.

Circuit 10 also has a third conduction path 30 which passes through capacitor discharge switch 31 and connects the first terminal 22 and second terminal 14. The resistance of the third conduction path 30 is smaller than the combined resistance of the first path 16 and the second path 20. Third conduction path 30 is closed when switch 31 receives a first digital signal from signal line 37 on switch signal input connection 32. The first digital signal indicates a motor overload condition. In the presently preferred embodiment shown, third conduction path 30 includes resistor 26 which is also a part of second conduction path 20.

The time constant for capacitor 12 discharging through the third conduction path 30 is selected based on the time that such motor 60 can be overloaded. The time constant for capacitor 12 charging through first conduction path 16 and second conduction path 20 may be comparable to the time needed for motor 60 to recover from an overload. However, it is anticipated that when motor 60 is shut down it will be re-enabled by software in the CPU to include effects due to ambient temperature, ventilation, etc.

Preferably, capacitor discharge switch 31 is a transistor and still more preferably it is a MOSFET. In the presently preferred embodiment of the invention, switch 31 is an N-channel MOSFET, but a P-channel MOSFET can be used equally well. Following standard practice in the art, it is preferred that a resistor 34 be connected as shown to protect switch 31.

In the presently preferred embodiment shown in FIG. 1, the first digital signal includes the overcurrent signal from logic gate 40 and also includes a signal on line 39 from a dead time pulse generator 38 which is triggered by the overcurrent signal from logic gate 40. Hence, the first digital signal continues to indicate an overcurrent condition for a predetermined time after cessation of an overcurrent signal from logic gate 40.

During normal operation of the motor 60, no overcurrent signal is received by the logic gate 40 or from the dead time pulse generator 38. Switch 31 is therefore closed and the voltage difference between terminals 14 and 22 of the capacitor 12 increases to approach the voltage difference between the first conductor 18 and the second conductor 24.

When an overcurrent signal is received by logic gate 40, switch 31 is opened and the voltage difference between such terminals 14 and 22 decreases. Hence, a relatively high voltage on capacitor 12 indicates normal operation of motor 60 and a low voltage indicates an overload condition.

The voltage of the capacitor 12 is received at an inverting terminal 47 of voltage comparator 45 which produces a second digital signal on line 49 when the voltage of capacitor 12 is below a predetermined voltage level. The second digital signal on such line 49 is for signalling a shut down switch which, preferably, is a shut down latch 48 that shuts down the motor 60. Preferably, motor 60 is shut down by a signal on motor fault signal line 55 which is connected through inverting inputs to the logic gates 108 and 110. Preferably, the motor fault signal is also connected by a line 56 to a CPU (not shown) which controls motor 60. In the presently preferred embodiment shown, a reset line 52 enables the CPU to reset the shutdown latch 48.

In the presently preferred embodiment of the invention, a thermal overload signal on line 44 is combined with the second digital signal on line 49 in logic gate 46. Logic gate 46 generates a third digital signal on line 54. The third digital signal, which indicates either overcurrent or overheat condition, is supplied on line 54 to the shut down latch 48. The thermal overload signal on line 44 may be supplied by a thermal sensor (not shown) in the windings of motor 60.

A motor overload circuit including circuit 10 and a shutdown switch, preferably, a shutdown latch 48 is indicated as 50 in FIG. 1.

Figure 3:
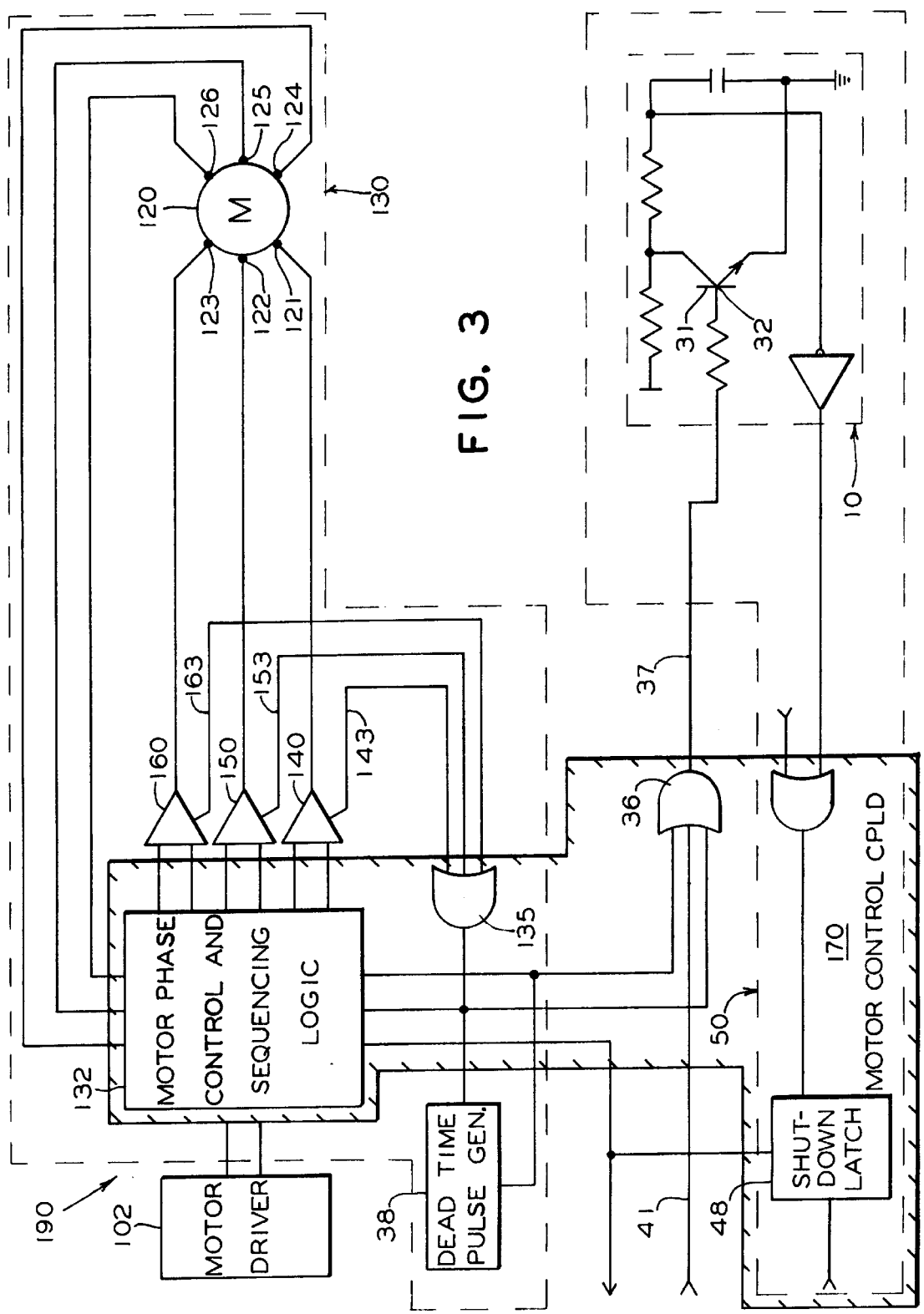
FIG. 3 is a block diagram of a motor protection circuit for a brushless DC motor powered by a pulse width modulated motor drive amplifier.

The block diagram in FIG. 3 shows an electric motor and motor control system, generally designated 190. It has a motor protection circuit, generally designated 50, connected to provide protection for a brushless DC motor 120. DC motor 120 has power input terminals 121, 122 and 123. Following standard practice in the art, brushless DC motor 120 is controlled by a pulse width modulated motor drive amplifier 130 which includes a motor phase and sequencing logic unit 132. Preferably, the motor phase control and sequencing logic unit 132 will be disposed on a motor control CPLD 170. Amplifier 130 also has ⅓ bridge amplifiers 140, 150 and 160 which supply power to the terminals 121, 122 and 123, respectively. Rotor position information is supplied by the terminals 124, 125 and 126 to such motor phase control and sequencing logic unit 132.

A person skilled in the art will recognize that each of the ⅓ bridge amplifiers, 140, 150 and 160 is similar to the ½ bridge amplifiers shown in greater detail in FIG. 2.

Signals communicated on lines 141, 151 and 161 from the motor phase control and sequencing logic unit 132 to ⅓ bridge amplifiers 140, 150 and 160 cause the amplifiers 140, 150 and 160 to connect motor terminals 121, 122 and 123, respectively, to the first power line 71.

Likewise, signals communicated on lines 142, 152 and 162 from the motor phase control and sequencing logic unit 132 to ⅓ bridge amplifiers 140, 150 and 160 cause the amplifiers 140, 150 and 160 to connect motor terminals 121, 122 and 123, respectively, to the second power line 72.

Current indicating signals from ⅓ bridge amplifiers 140, 150 and 160 are supplied on lines 143, 153 and 163 to logic gate 135 which supplies an overcurrent digital signal to logic gate 36 and to dead time pulse generator 38. Logic gate 36 also receives a signal from dead time pulse generator 38 and produces the first digital signal which it supplies on line 37 to input connection 32 of switch 31.

The motor protection circuit 50 shown in FIG. 3 connected to protect a brushless DC motor 120 operates in the same manner as the corresponding circuit in FIG. 1 for the DC motor 60 having brushes, except that the overcurrent signal is received from a three input logic gate 135, rather than from the two input logic gate 40.

The motor protection circuit of this invention has a number of fail safe features. If capacitor 12 is shorted out, then the voltage comparator sees a low voltage and sends a shut down signal on line 49 to logic gate 46 which activates shut down switch 48. If a lead to the capacitor fails, then when switch 31 is closed, voltage comparator 45 will see a low voltage and send a shut down signal on line 49.

In the presently preferred embodiment of the invention, motor protection circuit 10 includes a test signal line 41 which is connected as an input to logic gate 36. Test signal line 41 is a fail safe feature which is connected to the CPU which controls motor 60, or motor 120. Prior to operation of the motor 60, or motor 120, the CPU sends a signal on signal line 41 to the logic gate 36 to close the capacitor discharge switch 31. This reduces the voltage seen by voltage comparator 45 which sends a shutdown signal on signal line 49, so that shutdown switch 48, preferably a shutdown latch, is activated. This is reported to the CPU on motor fault signal lines 55 and 56. When the CPU detects the motor fault signal on the line 56, it has verified that capacitor discharge switch 31 is working. The CPU then sends a reset signal on reset signal line 52.

While a presently preferred and various additional alternative embodiments of the instant invention have been described in detail above in accordance the patent statutes, it should be recognized that various other modifications and adaptations of the invention may be made by those persons who are skilled in the relevant art without departing from either the spirit or the scope of the appended claims.

I claim:

1. A motor protection circuit for an electric motor driven by a pulse width modulated motor drive amplifier, said motor protection circuit comprising:

(a) a capacitor having a first terminal and a second terminal;

(b) a first conduction path connected at one end thereof to said first terminal and connectable at a second end thereof to a first conductor;

(c) a second conduction path connected at a first end thereof to said second terminal and connectable at a second end thereof to a second conductor, a substantially constant DC voltage difference existing between such second conductor and such first conductor;

(d) a third conduction path between said first terminal and said second terminal and having a conduction path resistance lower than a resistance of said first conduction path plus a resistance of said second conduction path, said third conduction path passing through a capacitor discharge switch, said capacitor discharge switch having a switch signal input connection to be opened and closed thereby, said switch signal input connection being connectable to a first digital signal indicating a motor overload condition, whereby said capacitor discharge switch is closed when such first digital signal indicates such motor overload condition and said capacitor discharge switch is opened during an absence of such first digital signal indicating such motor overload condition, so that a charge on said capacitor increases during such absence of first digital signal indicating such motor overload condition and so that said charge on said capacitor decreases when such first digital signal indicates such motor overload condition; and (e) a voltage comparator connected to receive a capacitor voltage from said capacitor, said capacitor voltage being due to said charge on said capacitor, said voltage comparator producing a second digital signal indicating whether said capacitor voltage is below a predetermined voltage level, said second digital signal being communicatable to a shut down switch to shut down such motor.

2. A motor protection circuit, according to claim 1, further including a logic gate for generating said first digital signal, said logic gate being connectable to receive an overcurrent digital signal indicating that a motor current through such motor is above a predetermined current level and also connectable to receive a signal from a dead time pulse generator triggered by such overcurrent digital signal.

3. A motor protection circuit, according to claim 2, further including a test connection connected as an input to said logic gate, said test connection being connectable to receive a test signal from a microprocessor controlling such motor, said test signal causing said switch to open and reduce said capacitor voltage.

4. A motor protection circuit, according to claim 1, wherein said capacitor discharge switch is a transistor.

5. A motor protection circuit, according to claim 4, wherein said transistor is a metal oxide semiconductor field effect transistor.

6. A motor protection circuit, according to claim 1, further including a logic gate connected to receive said second digital signal and a third digital signal indicating an excessive motor winding temperature, an output of said logic gate being connectable to such shut down switch to shut down such motor.

7. A motor protection circuit, according to claim 1, wherein said first conduction path has substantially zero resistance.

8. A motor protection circuit for an electric motor driven by a pulse width modulated motor drive amplifier, said motor protection circuit comprising:

(a) a capacitor having a first terminal and a second terminal;

(b) a first conduction path connected at one end thereof to said first terminal and connectable at a second end thereof to a first conductor;

(c) a second conduction path connected at a first end thereof to said second terminal and connectable at a second end thereof to a second conductor, a substantially constant DC voltage difference existing between such second conductor and such first conductor;

(d) a third conduction path between said first terminal and said second terminal and having a conduction path resistance lower than a resistance of said first conduction path plus a resistance of said second conduction path, said third conduction path passing through a capacitor discharge switch, said capacitor discharge switch having a switch signal input connection to be opened and closed thereby, said switch signal input connection being connectable to a first digital signal indicating a motor overload condition, whereby said capacitor discharge switch is closed when such first digital signal indicates such motor overload condition and said capacitor discharge switch is opened during an absence of such first digital signal indicating such motor overload condition, so that a charge on said capacitor increases during such absence of first digital signal indicating such motor overload condition and so that said charge on said capacitor decreases when such first digital signal indicates such motor overload condition;

(e) a voltage comparator connected to receive a capacitor voltage from said capacitor, said capacitor voltage being due to said charge on said capacitor, said voltage comparator producing a second digital signal indicating whether said capacitor voltage is below a predetermined voltage level; and (f) a shut down switch connected to shut down such motor based on said second digital signal.

9. A motor protection circuit, according to claim 8, further including a logic gate connected to receive said second digital signal and a third digital signal indicating an excessive motor winding temperature, an output of said logic gate being connected to said shut down switch.

10. A motor protection circuit, according to claim 8, wherein said shut down switch is a shut down latch.

11. A motor protection circuit, according to claim 8, wherein said shut down latch is connectable to a reset signal line to receive a signal from a microprocessor controlling such motor to reset said shut down latch and thereby turn such motor on.

12. A motor protection circuit, according to claim 8, wherein said first conduction path has substantially zero resistance.

13. An electric motor and motor control system having overload protection, said electric motor and motor control system comprising:

(a) an electric motor;

(b) a pulse width modulated motor drive amplifier connected to said electric motor to drive said electric motor;

(c) a capacitor having a first terminal and a second terminal;

(d) a first conduction path connected at one end thereof to said first terminal and connectable at a second end thereof to a first conductor;

(e) a second conduction path connected at a first end thereof to said second terminal and connectable at a second end thereof to a second conductor, a substantially constant DC voltage difference existing between such second conductor and such first conductor;

(f) a third conduction path between said first terminal and said second terminal and having a conduction path resistance lower than a resistance of said first conduction path plus a resistance of said second conduction path, said third conduction path passing through a capacitor discharge switch, said capacitor discharge switch having a switch signal input connection to be opened and closed thereby, said switch signal input connection being connectable to a first digital signal indicating a motor overload condition, whereby said capacitor discharge switch is closed when such first digital signal indicates such motor overload condition and said capacitor discharge switch is opened during an absence of such first digital signal indicating such motor overload condition, so that a charge on said capacitor increases during such absence of first digital signal indicating such motor overload condition and so that said charge on said capacitor decreases when such first digital signal indicates such motor overload condition;

(g) a voltage comparator connected to receive a capacitor voltage from said capacitor, said capacitor voltage being due to said charge on said capacitor, said voltage comparator producing a second digital signal indicating whether said capacitor voltage is below a predetermined voltage level; and (h) a shut down switch connected to receive said second digital signal, said shut down switch being connected to shut down said motor.

14. An electric motor and motor control system, according to claim 13, further including a logic gate connected to generate said first digital signal, said logic gate being connectable to receive an overcurrent digital signal indicating that a motor current through said motor is above a predetermined current level and also a signal from a dead time pulse generator triggered by said overcurrent digital signal.

15. An electric motor and motor control system, according to claim 13, wherein said shut down switch is a shut down latch.

16. An electric motor and motor control system, according to claim 15, wherein said shut down latch has a reset signal input connectable to receive a signal from a microprocessor controlling said motor to reset said shut down latch and thereby turn said motor on.

17. An electric motor and motor control system, according to claim 13, wherein said shut down switch is connected to said pulse width modulated motor drive amplifier to turn off said motor drive amplifier and thereby turn said motor off.

18. An electric motor and motor control system, according to claim 13, wherein said motor drive amplifier is an H-bridge amplifier.

19. An electric motor and motor control system, according to claim 18, further having a logic gate connected to receive two overcurrent signals from said H-bridge amplifier, an output of said logic gate being connected to supply said first digital signal indicative of such motor overload condition.

20. An electric motor and motor control system, according to claim 13, wherein said motor is a DC motor.

21. An electric motor and motor control system, according to claim 13, wherein said motor is a brushless DC motor.

22. An electric motor and motor control system, according to claim 21, further having a logic gate connected to receive three overcurrent signals from said motor drive amplifier, an output of said logic gate being connected to supply said first digital signal indicative of such motor overload condition.

* * * * *